United States Patent [19]
Takahashi et al.

[11] Patent Number: 5,850,711
[45] Date of Patent: Dec. 22, 1998

[54] VEHICLE WINDOW OPENING/CLOSING DEVICE

[75] Inventors: Shunzo Takahashi, Kiryu; Masayuki Tamura, Ohta, both of Japan

[73] Assignee: Mitsuba Corporation, Kiryu, Japan

[21] Appl. No.: 858,185

[22] Filed: May 20, 1997

[30] Foreign Application Priority Data

May 23, 1996 [JP] Japan ..................................... 8-151591

[51] Int. Cl.$^6$ .................................................. E05F 11/44
[52] U.S. Cl. ............................................... 49/351; 49/350
[58] Field of Search ............................ 49/348, 349, 350, 49/351

[56] References Cited

U.S. PATENT DOCUMENTS

| | | | |
|---|---|---|---|
| 3,552,061 | 1/1971 | Hermann | 49/351 |
| 3,788,005 | 1/1974 | Mistopoulos | 49/351 X |
| 4,986,029 | 1/1991 | Richter | 49/351 X |
| 5,255,470 | 10/1993 | Dupuy . | |

FOREIGN PATENT DOCUMENTS

| | | |
|---|---|---|
| B2 3-38390 | 6/1991 | Japan . |
| 6-73946 | 3/1994 | Japan . |

*Primary Examiner*—Jerry Redman
*Attorney, Agent, or Firm*—Oliff & Berridge, PLC

[57] ABSTRACT

A vehicle window opening/closing device is shown for opening and closing a window glass by link action executed by a sector gear that is reciprocally swung by rotation of a pinion gear. A lift arm and a coupling link are also provided. When the window glass is in its fully-closed-state, the journaling point at which the coupling link is supported by the sector gear is set to cross a fulcrum position defined by the positional relationship between the sector gear and the coupling link. A regulation portion composed of a regulating piece and a regulated piece is provided between the sector gear and the coupling link to thereby regulate movement of the coupling link in a beyond-fulcrum-position direction across the fully-closed-state. With this arrangement, the size of the device is not increased when a mechanism for locking the window glass when it is fully closed is attained.

11 Claims, 3 Drawing Sheets

DURING OPENING/ CLOSING OPERATION

STATE JUST BEFORE FULLY-CLOSED-ATTITUDE IS TAKEN

FULLY-CLOSED-ATTITUDE 5,850,711

VEHICLE WINDOW OPENING/CLOSING DEVICE

BACKGROUND OF THE INVENTION

1. Field of Invention

The present invention belongs to the technical field of a window opening/closing device for vehicles such as buses, trucks, passenger cars and the like.

2. Description of Related Art

In general, some of these types of vehicles are arranged to open and close a window glass by opening/closing means based on forward/rearward rotation of an output gear. In this arrangement, there is a possibility that crime prevention is ineffective because the window glass can be opened by the rotation of the output gear which is caused when the window glass is forcibly pushed down. Thus, it is necessary to cope with this problem by preventing the window glass from being pushed down by means of increasing the force necessary to rotate an electric motor from the window glass side by increasing the speed reduction ratio of a speed reducing mechanism disposed to a power transmission system from the output gear, or to dispose a coil spring to the output gear to prevent reverse rotation thereof by expanding its diameter when the output gear is reversely rotated, and the like.

However, the former arrangement in which the speed reduction ratio is increased has problems in that since a driving force greater than that necessary for the opening/closing operation is required, the size of the opening/closing means must be increased to cope with the greater driving force and the opening/closing speed of the window glass is decreased. The latter arrangement has a problem in that the number and size of parts are increased. Therefore, these problems are subject to solution by the present invention.

SUMMARY OF THE INVENTION

According to the present invention, which is made to solve the above problems taking the aforesaid circumstances into consideration, there is provided a vehicle window opening/closing device for opening and closing a window glass by forward and backward rotation of an output gear, the device comprising a pinion gear for rotating the opening/closing device by forward and backward drive of the output gear, a sector gear rotatably supported by a body and swung about a pivot point by rotation of the pinion gear, a lift arm having an extreme or distal end coupled with the window glass and a base or proximal end rotatably supported by a body, a coupling link having an end rotatably supported by the sector gear and the other end rotatably supported by the lift arm, means for setting the totally-closed-position of the window glass to a position where the journaling point at which the coupling link is supported by the sector gear crosses a fulcrum position between the swingingly supporting point or pivot point of the sector gear and the journaling point where the coupling link is supported by the lift arm. The window glass is opened and closed by link action of the coupling link and the lift arm caused by swing motion of the sector gear. Regulating means are provided for regulating movement of at least one of the sector gear and the coupling link in a direction even further beyond the fulcrum line.

DETAILED DESCRIPTION OF PREFERRED EMBODIMENTS

Figure 1:
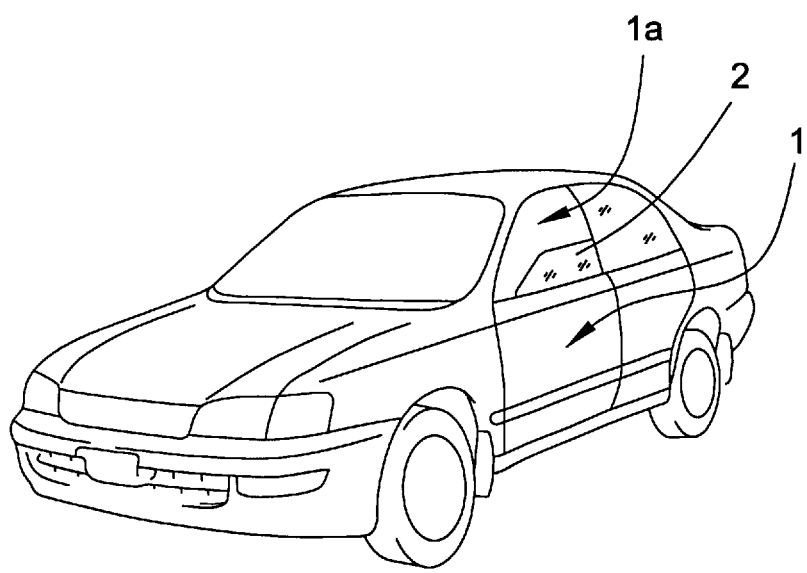
FIG. 1 is a schematic perspective view of a vehicle.

An embodiment of the present invention will be described based on FIG. 1 to FIG. 3. In the drawings, numeral 1 denotes a door main body on a vehicle. A window composed of a window glass 2 is upwardly and downwardly movably fitted into an opening 1a formed in the door main body 1. The window glass 2 changes its attitude to a closed attitude for closing the opening 1a by moving upward, and an open attitude for opening the opening 1a by moving downward. The attitude of the window glass 2 is automatically changed in the embodiment by an automatic opening/closing device including an electric motor 3 as described below.

That is, a mounting bracket 4 is interposed between an interior material and an exterior material of door main body 1. The bracket 4 is disposed toward the lower portion of the opening 1a of the door main body 1 and mounted integrally therewith. The gear shaft portion 5a of a pinion gear 5, which is associated and coupled with the electric motor 3 makes up part of the automatic opening/closing device. Gear shaft portion 5a is rotatably supported by the mounting bracket 4, and the pinion gear 5 is rotated forward and backward as the electric motor 3 is driven forward and backward. A sector gear 6 having gear teeth 6a formed on the outer periphery thereof, is meshed with the pinion gear 5. The sector gear 6 is swingably supported at the base end thereof by the mounting bracket 4 through a swing support shaft 6b so that it is reciprocally swung as the pinion gear 5 rotates forward and backward. A lift arm 7 whose extreme or distal end portion 7a is coupled with the window glass 2 is rotatably supported by the mounting bracket 4 at the base or proximal end thereof through a swing support shaft 7b. An end of a coupling link 8 is rotatably supported by the lift arm 7 through a support shaft 8a, and the other end of the coupling link 8 is rotatably supported by sector gear 6 through a support shaft 8b. The extreme distal end portion 7a of the lift arm 7 associated and coupled with the window glass 2 is reciprocally swung in an upward/downward direction by the combined action of the lift arm 7 and the coupling link 8 caused by the reciprocating swing motion of the sector gear 6.

Although a guide roller 7c is rotatably supported at the extreme end portion 7a of the lift arm, the guide roller 7c is movably engaged with and supported by a guide rail 2a disposed to the lower end portion of the window glass 2. The window glass 2 is moved upward and downward in a closing/opening motion by liftarm 7 as the guide roller 7c moves horizontally along the guide rail 2a. Movement of guide roller 7c is caused by reciprocating swing motion of the extreme end portion 7a of the lift arm.

Next, the combined action executed by the sector gear 6, the lift arm 7 and the coupling link 8 will be described based on FIG. 2 and FIG. 3. First, when the window glass 2 is in its fully-open-attitude, the sector gear 6, the lift arm 7 and the coupling link 8 have the positional relationship shown by the broken line in FIG. 2. That is, in this positional relationship, the journaling point A where the coupling link 8 is supported by the sector gear 6 is located below the virtual line X connecting a swing journaling point B which is the base end portion 6b of the sector gear 6 to the journaling point C where the coupling link 8 is supported by the lift arm 7. When the electric motor 3 is driven in a window closing direction from this state, that is, when it is driven to rotate the pinion gear 5 in the direction of arrow Y shown in FIG. 2, the sector gear 6, the lift arm 7 and the coupling link 8 are swung in the direction of the arrow Q, respectively, so that the lift arm 7 is moved upward. Then, at the position just before the window glass 2 takes a fully-closed-attitude, the sector gear 6 and the coupling link 8 are located on the virtual line Z along which both the journaling points B and C are connected to each other through the journaling point A, so that the respective journaling points A, B and C are positioned in a straight line, referred to hereinafter as the fulcrum position. However, the electric motor 3 still continues to rotate in the direction of arrow Y and then stops when the sector gear 6 and the coupling link 8 move to a position where the journaling point A goes a little beyond the virtual line Z, that is, where the journaling point A moves to a beyond-fulcrum-position across from between both the journaling points B and C (a position where the angle between the straight line AB and the straight line BC (∠ABC) is α) as shown in FIG. 3(c).

More specifically, the lift arm 7 is at its uppermost position when the respective journaling points A, B and C are located on the virtual line Z. When the lift arm 7 crosses the virtual line Z, it moves by a lowering process. In the embodiment, however, since the amount of change in the swing of the lift arm 7 is made small with respect to the amount of change in the swing angle of the sector gear 6 and the coupling link 8 in the vicinity of the point where the sector gear 6 and the coupling link 8 cross the above-described fulcrum position, the window glass 2 is moved only slightly upward and downward by the lift arm 7 from the time when journaling point A crosses the fulcrum position to the time when coupling link 8 and lift arm 7 stop, so that the upper portion of the opening 1a is not opened.

Figure 2:
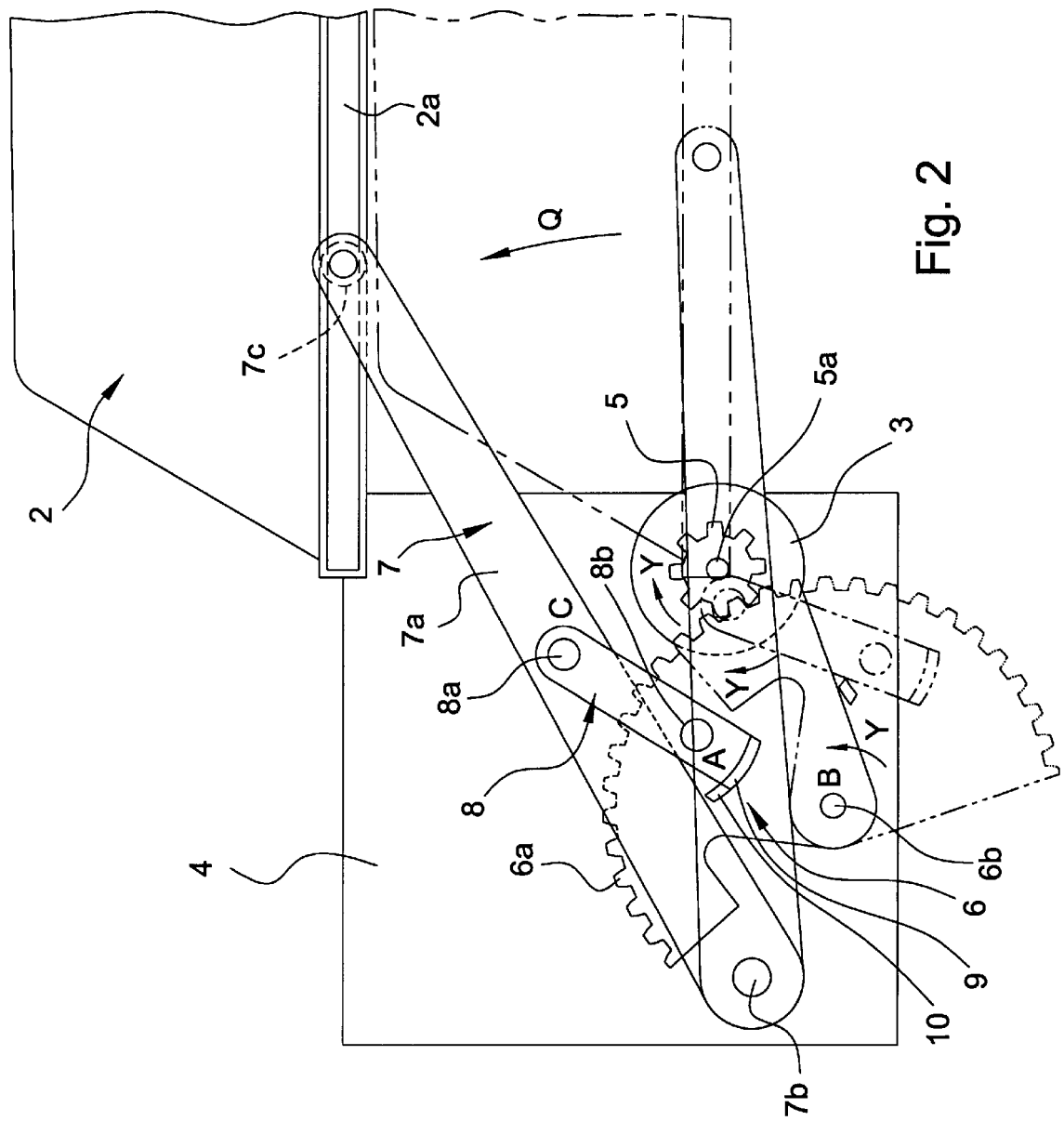
FIG. 2 is a schematic front elevational view explaining operation of an automatic opening/closing device.
Figure 3A:
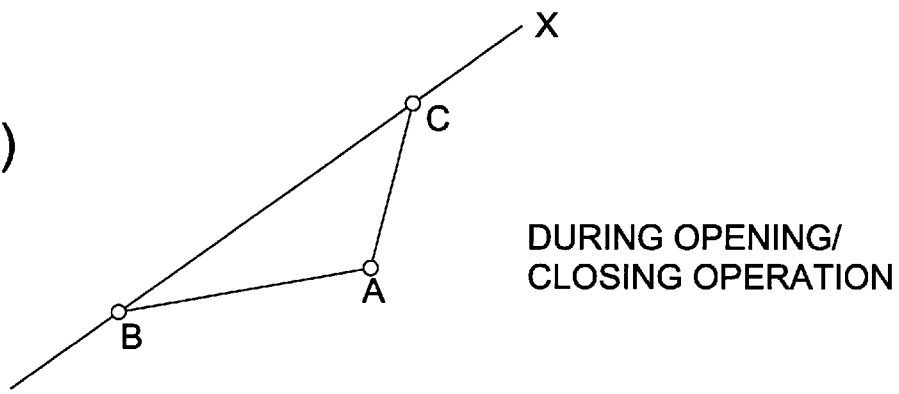
FIGS. 3(A), 3(B), 3(C) are views explaining the open state of a window glass, the state just before window glass is closed fully and the positional relationship between a sector gear and a coupling link in the fully closed state, respectively.
Figure 3B:
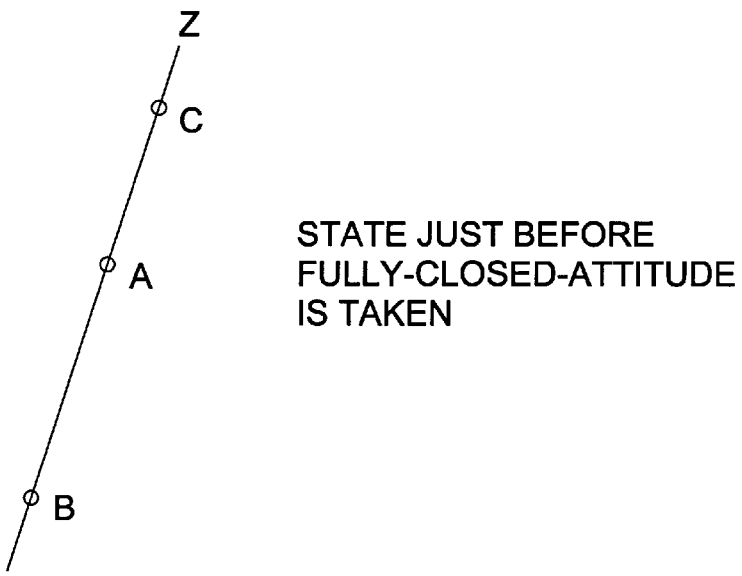
Figure 3C:
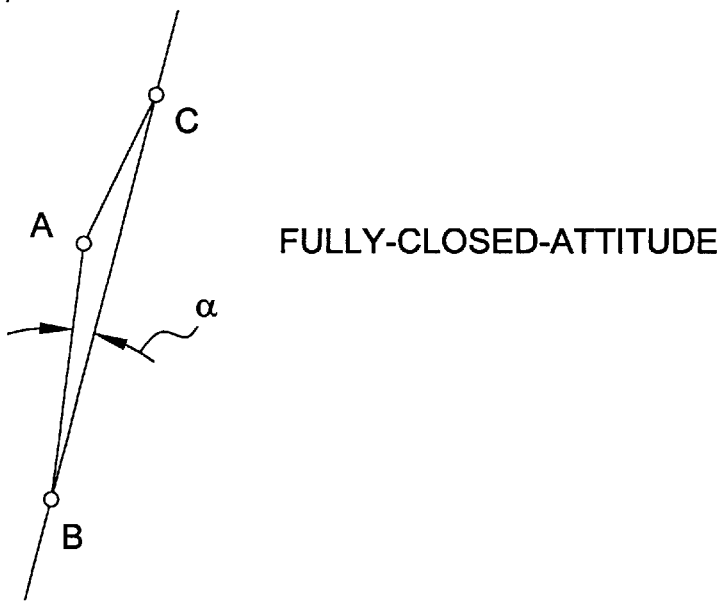

Further, in the embodiment, a regulating piece 9 shown in FIG. 2 depends from the coupling link 8 on the journaling point side A thereof, where it is supported by the sector gear 6. A regulated piece 10 projects from the sector gear 6 at the position confronting the regulating piece 9 when the window glass 2 is fully closed. Then, when the sector gear 6 and the coupling link 8 attempt to continue to move beyond the fulcrum position after achieving the fully-closed-attitude of the window glass 2 the regulating piece 9 is abutted against the regulated piece 10 and brought into an interfered state, thereby providing means for regulating further movement of the coupling link 8. With this arrangement, when an external force is applied to the window glass 2 to forcibly push it downward, a downward force is applied to the lift arm 7 and is transmitted through link 8 to sector gear 6. Pieces 9 and 10 regulate the further movement of the sector gear 6 and the coupling link 8 beyond the fulcrum position, so that the means for regulating further movement of coupling link 8 is arranged in the embodiment to lock the opening of the window glass 2.

More specifically, since an automatic opening action by the electric motor 3 is executed through the pinion gear 5, which forcibly swings the sector gear 6 downward, this operation can be carried out without causing any problem in the direction opposite to the direction in which the regulating piece 9 interferes with the regulated piece 10. The opening lock executed by the regulating portion functions only when the window glass 2 is forcibly pushed downward.

In the embodiment of the present invention arranged as described above, the window glass 2 for opening and closing the opening 1a of the door main body 1 is automatically moved downward and upward by driving the electric motor 3 of the automatic opening/closing device. The window glass 2 is opened and closed by the combined action of the sector gear 6, the lift arm 7 and the coupling link 8. However, since the sector gear 6 and the coupling link 8 stop at a position where the journaling point A goes a little beyond the fulcrum position defined between the journaling points B and C, an external force, which is applied to swing the lift arm 7 downward so as to forcibly push the window glass 2 from its fully-closed-attitude downward, causes the sector gear 6 and the coupling link 8 which have crossed the above fulcrum position to swing further, thereby increasing the beyond-fulcrum-position relationship thereof. As a result, since the regulating piece 9 is abutted against the regulated piece 10 as described above, the swing motion of the coupling link 8 in the above direction is regulated to lock the opening of the window glass 2, so that the window glass 2 cannot be opened.

As described above, when the window glass 2 in its fully-closed-attitude is opened by an external force, since the opening of the window glass 2 is locked, downward movement of the window glass 2 by its dead weight is also prevented. Since the lock is achieved by the link mechanism for opening and closing the window glass 2 without disposing a lock mechanism on the electric motor side, such as the conventional means for increasing the speed reduction ratio of an electric motor, the size and weight of the electric motor can be reduced. The electric motor need only have a capacity capable of opening and closing the window glass 2, and therefore it is not necessary to increase the speed reduction ratio of the electric motor. In addition, since the system cannot be operated reversely by a load applied to the window glass, there is no disadvantage that the durability of the system is lowered when an unnatural force is applied thereto.

Since the journaling point A crosses the fulcrum position between the sector gear 6 and the coupling link 8 at the point just before the window glass 2 is fully closed in the embodiment, as the window glass 2 approaches its fully-closed-attitude, the opening/closing speed thereof is reduced. As a result, there is an advantage that when it is desired to slightly open the window glass 2, the opening operation can be easily adjusted.

The present invention is not limited to the above embodiment. That is, any regulating portion may be employed so long as any one of the sector gear and the coupling link regulates the movement of the coupling link in the direction across the fulcrum position when the window glass achieves its fully-closed-attitude. Thus, the regulating piece and the regulated piece need not be formed to the coupling link and the sector gear, respectively, as shown in the above embodiment. The regulating piece may be formed to any one of the members such that it will abut against the other member at the locked position. Further, since it suffices to regulate the movement of any one of the coupling link and the sector gear which move in the direction across the fulcrum position when the window glass achieves its fully-closed-attitude in the present invention, the regulating piece may be interposed, for example, between the lift arm and the coupling link or the sector gear, or between the body and the coupling link or the sector gear.

What is claimed is:

1. A vehicle window opening/closing device for opening and closing a window glass, said device comprising:

a pinion gear for reciprocating the opening/closing device by forward and backward drive of an output shaft;

a sector gear having a first journaling point for being rotatably supported by a body and said sector gear being swung about said first journaling point by rotation of said pinion gear;

a lift arm having an extreme end with coupling means for being coupled with the window glass and a base end with support means for being rotatably supported by the body;

a coupling link having an end with a second journaling point at which said coupling link is rotatably supported by said sector gear and an opposite end of said coupling link having a third journaling point at which said coupling link is rotatably supported by said lift arm;

means for setting a fully-closed-position of the window glass to a position where said second journaling point crosses a fulcrum position that is established as a straight line between said first journaling point and said third journaling point with said second journaling point approaching said fulcrum position from one side of said straight line as the fully closed position is approached by movements of said coupling link and said lift arm caused by a swing motion of said sector gear, and said second journaling point crossing said straight line to a beyond-fulcrum-position at the opposite side of said straight line when reaching the fully-closed-position; and regulating means for regulating movement of at least one of said sector gear and said coupling link in order to regulate movement of said second journaling point in a direction further beyond said beyond-fulcrum-position.

2. The vehicle window opening/closing device according to claim 1, wherein said regulating means is formed between said sector gear and said coupling link.

3. The vehicle window opening/closing device according to claim 1, wherein said regulating means is formed between said lift arm and said sector gear.

4. The vehicle window opening/closing device according to claim 1, wherein said regulating means includes a component for attachment to the body and is formed between said component and said coupling link.

5. The vehicle window opening/closing device according to claim 1, wherein said regulating means includes a component for attachment to the body and is formed between said component and said sector gear.

6. A vehicle window opening/closing device for opening and closing a window glass, said device comprising:

a pinion gear;

a sector gear rotatably supported at a first pivot point such that said sector gear is drivingly engaged with said pinion gear;

a lift arm rotatably supported at a second pivot point with a distal end of said lift arm having coupling means for slidably engaging the window glass;

a coupling link having an end with a third pivot point at which said coupling link is pivotally connected to said sector gear and an opposite end with a fourth pivot point at which said coupling link is pivotally connected to said lift arm intermediate said second pivot point and said coupling means;

said sector gear, lift arm, and coupling link being positioned relative to each other such that rotation of said pinion gear in a first direction drives said third pivot point from one side of a straight line intersecting said first and fourth pivot points to the opposite side of said straight line, and stop means for preventing further movement of said third pivot point beyond the position on the opposite side of said straight line assumed by said third pivot point when said pinion gear is through rotating in said first direction.

7. The vehicle window opening/closing device according to claim 6, wherein said stop means includes a first projection on said sector gear and a second projection on said coupling link.

8. The vehicle window opening/closing device according to claim 6, wherein said stop means includes projections on at least one of said lift arm and said coupling link.

9. The vehicle window opening/closing device according to claim 6, wherein said stop means includes projections on at least one of said lift arm and said sector gear.

10. The vehicle window opening/closing device according to claim 6, wherein said stop means includes a projection on said coupling link.

11. The vehicle window opening/closing device according to claim 6, wherein said stop means includes a projection on said sector gear.

* * * * *